June 9, 1959 — L. O. WAITE — 2,890,341
CALUTRON PLANT ARRANGEMENT
Filed Aug. 9, 1946 — 3 Sheets-Sheet 1

INVENTOR
LESLIE O. WAITE
BY
ATTORNEY

June 9, 1959 L. O. WAITE 2,890,341
CALUTRON PLANT ARRANGEMENT
Filed Aug. 9, 1946 3 Sheets-Sheet 2

INVENTOR
LESLIE O. WAITE
BY
ATTORNEY

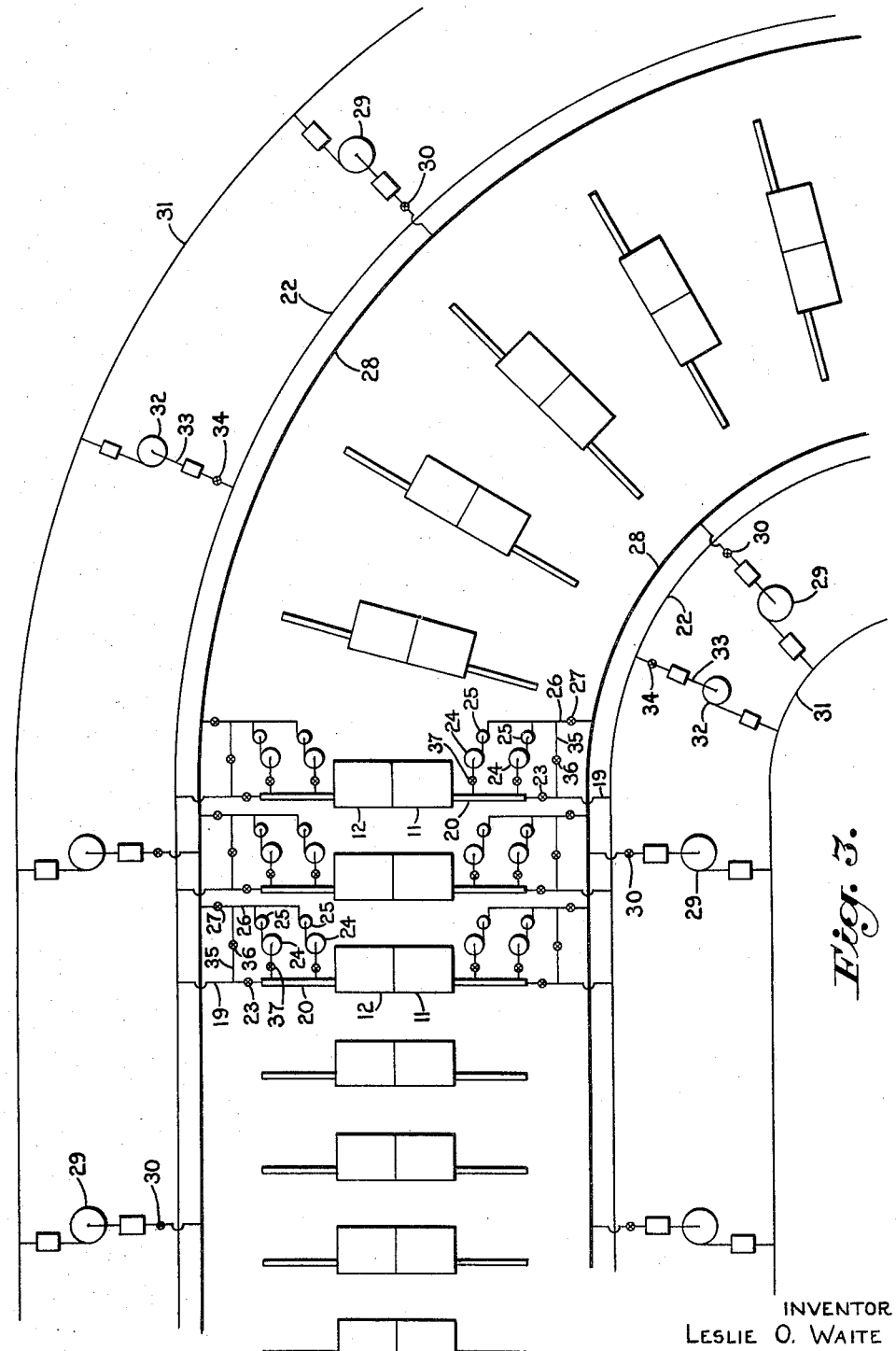

United States Patent Office 2,890,341
Patented June 9, 1959

2,890,341

CALUTRON PLANT ARRANGEMENT

Leslie O. Waite, Weston, Mass., assignor, by mesne assignments, to the United States of America as represented by the United States Atomic Energy Commission Application August 9, 1946, Serial No. 689,482

7 Claims. (Cl. 250—41.9)

The present invention relates to a calutron system comprising a plurality of calutron units arranged in a closed geometric figure, with pumping means for evacuating the tanks of each unit depending from the bottom of said tanks and a complete pumping system arranged in the space below the plant floor which supports the calutron tanks.

For a complete description of a calutron and a calutron system embodying a closed series of calutron tanks, reference is made to U. S. Patents Nos. 2,709,222 and 2,721,272, which were respectively issued to Ernest O. Lawrence on May 24, 1955, and October 18, 1955.

For completeness, it is desirable to note at present merely that a calutron is an apparatus for effecting separation and collection of isotopes of elements, for example, uranium by electromagnetic means. For the purpose, relatively large, massive tanks are provided, positioned between electromagnets, each of which tanks in use is to be evacuated to a pressure on the order of $10^{-4}$ to $10^{-5}$ mm. Hg.

The present invention relates particularly to a plant arrangement in which the component parts are arranged in a particular manner to effect most efficient operation, economy in construction and operation, and substantial savings of space.

It is accordingly an object of the present invention to effect economies in construction and operation of a calutron system, and to improve the efficiency thereof by a novel arrangement and design of the elements thereof.

It is a feature of the present invention to provide the tanks and magnets in an alternated, closed series on a floor of a plant, and to provide the necessary pumping apparatus on the floor beneath.

It is a further feature of the present invention to provide a pumping system for evacuating a plurality of calutron tanks in which individual tanks are connected to roughing and finishing headers, both of which are connected to mechanical pumps, and large capacity diffusion pumping apparatus interconnected between each of said tanks and the finishing header provided therefor.

Other objects will become apparent as the description proceeds, especially when taken in conjunction with the appended drawings, in which:

Fig. 3 is a diagrammatic view looking downwardly showing the arrangement of pumping apparatus illustrated in Fig. 3 as applied to a continuous series of alternated tanks and magnets.

Figure 1:
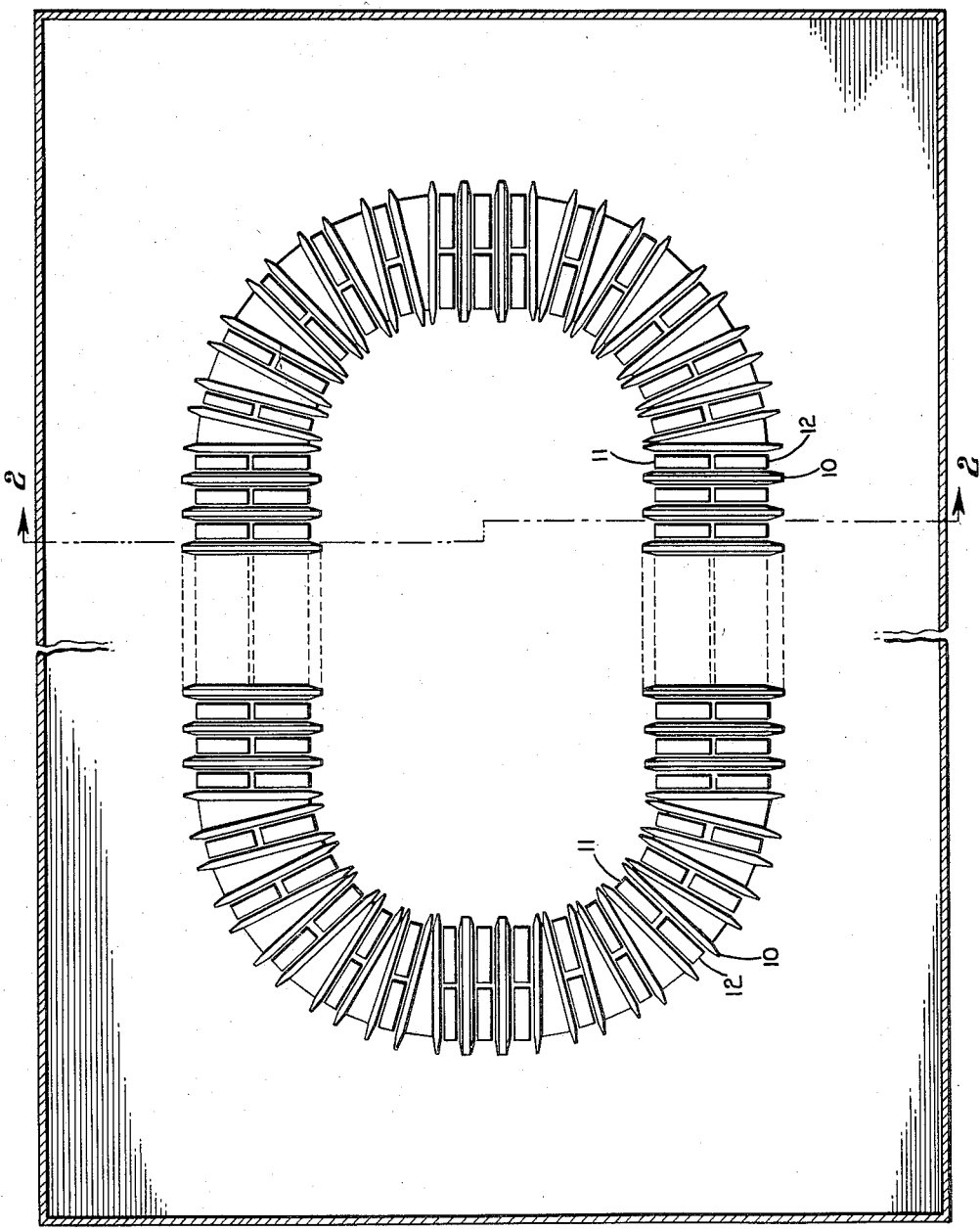
Figure 1 is a fragmentary plan view of a calutron system showing the arrangement of tanks and magnets.

Referring first to Fig. 1, I have illustrated an arrangement of alternated calutron tanks and magnets known in the art as a "race track," due to the fact that the elements are arranged in a closed series having two straight, parallel runs interconnected at their ends by alternated tanks and magnets arranged in curved series. I have shown electromagnets 10, each of which comprises a central core and a surrounding winding spaced apart to receive therebetween inner tanks 11 and outer tanks 12. It will be understood that the inner vertical edge walls of inner tanks 11, and the outer vertical edge walls of outer tanks 12, are in the form of or carry removable face plates which in turn support the transmitter and receiver pair of the ion separating structure. Thus, access to these walls of the tanks for connection thereto of pumping lines is impractical.

Figure 2:
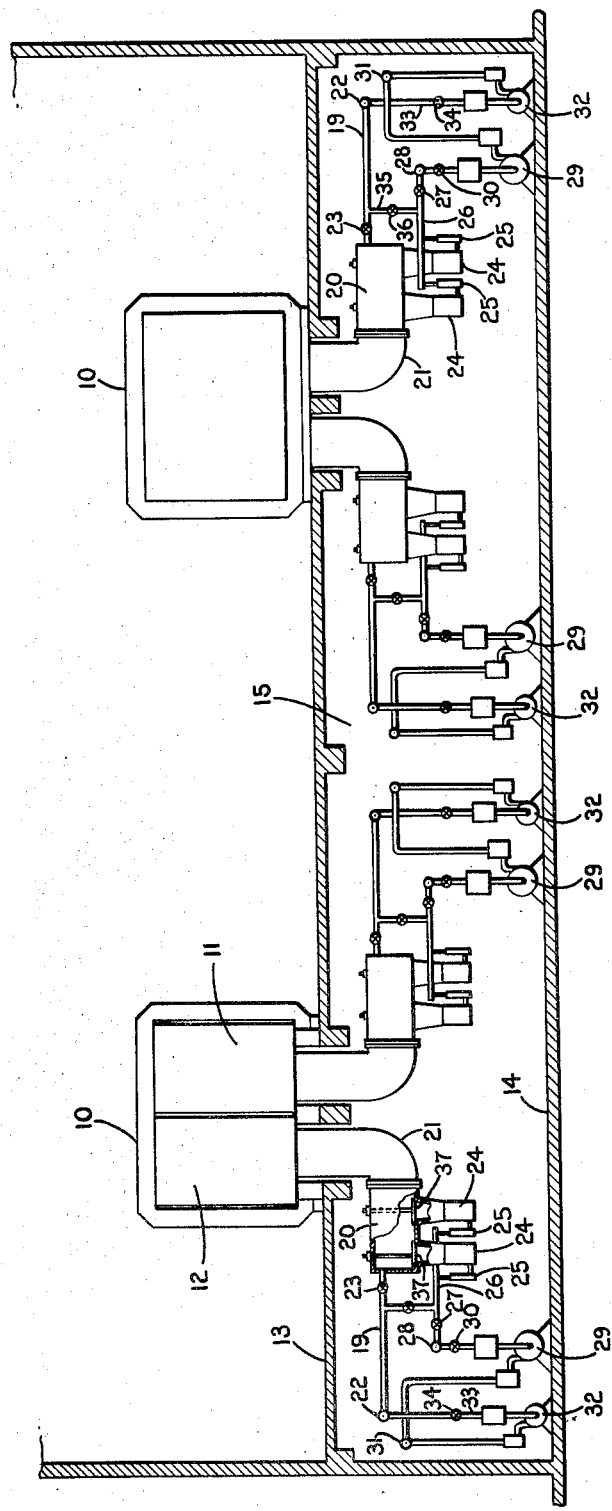
Fig. 2 is a vertical section on the line 2—2 of Fig. 1.

Referring now to Figs. 2 and 3, I have shown the magnets 10, tanks 11 and 12 as supported on a floor 13 of a plant, the floor 13 being spaced above a lower floor 14 to provide a working space 15 below the floor 13. Preferably, due to the massive nature of the structure employed, the space 15 will constitute a basement, and the floor 13 will be the main floor of a single story plant.

In order to maintain the desired low operating pressure in tanks 11 and 12, large manifolds 20 are connected to tanks 11 and 12, as by elbows 21. Manifolds 20 are connected to roughing header pipe 22 by lines 19, valves 23 being provided in the connecting lines 19. Manifolds 20 are connected to pairs of large diffusion pumps 24 and small diffusion pumps 25 in series through manifold valves 37, the pumps discharging through lines 26 provided with valves 27 into finishing headers 28. Mechanical finishing pumps 29 are connected to finishing headers 28, the connection being controlled by valves 30, and pumps 29 discharge into exhaust headers 31. In like manner, roughing headers 22 are connected to roughing mechanical pumps 32 through lines 33, valves 34 being provided therein. Lines 19 and 26 are interconnected by lines 35 having valves 36 therein.

Evacuation of the tanks is effected by first connecting the tanks to the roughing headers 22, valves 23 and 34 being open, and the others closed. When pressure in the tanks is reduced to a value where efficient operation of diffusion pumps 24 and 25 is possible, these pumps are started, valves 37, 27 and 30 being opened.

In Fig. 3, I have shown the correlation between elements constituting the evacuating system in a race track. In this figure, it will be observed that roughing headers 22 are disposed to follow the race track, and exhaust through mechanical pumps 32 to the exhaust headers 31. Preferably, roughing headers 22 are sectionalized by providing valves at spaced points therealong. In like manner, finishing headers 28 extend along the race track, and may be sectionalized, if desired, either by spaced valves, or by being initially provided in spaced sections.

This arrangement of pumps, both as regards their connections and their physical locations with respect to other elements of the system permit most efficient operation and contribute substantially to the successful production which has been attained in practice.

While I have described a preferred embodiment of my improved calutron system, it will be understood that this description has been made in considerable detail merely to permit those skilled in the art to practice my invention, the scope of which is indicated in the appended claims.

What is claimed is:

1. In a plant arrangement for a plurality of calutron units, a building comprising a first floor, a second floor constituting a working platform, a calutron unit including a substantially fluid-tight tank supported on said second floor, a manifold connected to said tank and extending below said second floor, means for evacuating said tank comprising a mechanical pump connected to said manifold and supported on said first floor.

2. In a plant arrangement for a plurality of calutron units, a building comprising a first floor, a second floor constituting a working platform, a calutron unit including a substantially fluid-tight tank supported on said second floor, a manifold connected to said tank and extending below said second floor, means for evacuating said tank comprising a mechanical pump connected to said manifold and supported on said first floor, and a diffusion pump suspended from said manifold beneath said second floor.

3. In a plant arrangement for housing a plurality of calutron units, a horizontally extending series of massive electromagnets arranged in spaced-apart relation and adapted to set up a continuous magnetic field therethrough, a substantially fluid-tight tank positioned between each adjacent pair of magnets to be traversed by said magnetic field, said magnets and tanks being positioned substantially above a first floor of said plant, a working platform constituting a second floor of said plant located just beneath the bottoms of said magnets and tanks, a manifold connected to each of said tanks and extending beneath said second floor, and means for evacuating said tanks comprising a plurality of diffusion pumps depending from each of said manifolds, and a plurality of mechanical pumps supported on said first floor and connected to said manifolds.

4. A calutron comprising a series of spaced electromagnets, a plurality of substantially fluid-tight tanks each disposed between a pair of electromagnets to receive a series magnetic field set up by said magnets, a plurality of electromagnetic ion separating devices respectively disposed in said tanks, means for exhausting said tanks comprising a roughing header connected to a plurality of said tanks, a plurality of mechanical roughing pumps with their inlets connected to said roughing header, and an exhaust header to which said roughing pumps discharge.

5. A calutron comprising a series of spaced electromagnets, a plurality of substantially fluid-tight tanks each disposed between a pair of electromagnets to receive a series magnetic field set up by said magnets, a plurality of electromagnetic ion separating devices respectively disposed in said tanks, means for exhausting said tanks comprising a roughing header connected to a plurality of said tanks, a plurality of mechanical roughing pumps with their inlets connected to said roughing header, an exhaust header to which said roughing pumps discharge, a plurality of diffusion pumps having their inlets connected to said tanks, a finishing header to which said diffusion pumps discharge, a plurality of mechanical finishing pumps having their inlets connected to said finishing header, and means connecting the exhaust side of said mechanical finishing pumps to said exhaust header.

6. A calutron comprising a series of spaced electromagnets, a plurality of substantially fluid-tight tanks each disposed between a pair of electromagnets to receive a series magnetic field set up by said magnets, a plurality of electromagnetic ion separating devices respectively disposed in said tanks, means for exhausting said tanks comprising roughing means comprising a plurality of mechanical pumps connected to said tanks, and finishing means comprising a combination of diffusion and mechanical pumps connected to said tanks, and valve means for connecting either said roughing means or said finishing means to said tanks.

7. In a calutron system, a pair of horizontally spaced-apart electromagnets, a pair of tanks in the space between said magnets arranged in back-to-back relationship and having oppositely disposed front edge walls accessible from the sides between said magnets, pumping manifolds connected to the bottoms of said tanks, and evacuating apparatus connected to said manifolds.

No references cited.